(12) United States Patent
Hao

(10) Patent No.: US 12,392,793 B2
(45) Date of Patent: Aug. 19, 2025

(54) TEST KIT

(71) Applicant: SHIJIAZHUANG HIPRO BIOTECHNOLOGY CO., LTD., Hebei (CN)

(72) Inventor: Shushun Hao, Hebei (CN)

(73) Assignee: Shijiazhuang Hipro Biotechnology Co., Ltd., Hebei (CN)

(*) Notice: Subject to any disclaimer, the term of this patent is extended or adjusted under 35 U.S.C. 154(b) by 455 days.

(21) Appl. No.: 17/626,897

(22) PCT Filed: Dec. 11, 2020

(86) PCT No.: PCT/CN2020/135702
§ 371 (c)(1),
(2) Date: Jan. 13, 2022

(87) PCT Pub. No.: WO2021/121154
PCT Pub. Date: Jun. 24, 2021

(65) Prior Publication Data
US 2023/0349939 A1    Nov. 2, 2023

(30) Foreign Application Priority Data
Dec. 19, 2019 (CN) .......................... 201911314110.4

(51) Int. Cl.
*G01N 35/10* (2006.01)

(52) U.S. Cl.
CPC ..... *G01N 35/1002* (2013.01); *G01N 35/1016* (2013.01)

(58) Field of Classification Search
CPC .............. G01N 35/1002; G01N 35/1016
See application file for complete search history.

(56) References Cited

U.S. PATENT DOCUMENTS 3,628,767 A * 12/1971 Lombard ............ F16K 31/0651
                                              251/129.21
3,741,000 A *  6/1973 Miller .................... G01N 9/002
                                                   73/32 A
(Continued)

FOREIGN PATENT DOCUMENTS

CN       101756667 A    6/2010
CN       206466953 U    9/2017
(Continued)

*Primary Examiner* — Lyle Alexander
*Assistant Examiner* — Dwan A Gerido
(74) *Attorney, Agent, or Firm* — AP3 Law Firm PLLC

(57) ABSTRACT

A test kit comprising an annular magnet (2), a ball (3), a magnetic bar (4), an electromagnetic coil (5), a box body (6), an air inlet (7), a liquid outlet pipe (8) and a sealing gasket (9), wherein the liquid outlet pipe (8) is located on the bottom face of the box body (6), the top of the liquid outlet pipe (8) is fixed to the box body (6), the cylindrical magnetic bar (4) is arranged in the middle of the liquid outlet pipe (8), the bottom of the magnetic bar (4) is fixedly connected to the ball (3), the round sealing gasket (9) is arranged in a hole in the lower portion of the liquid outlet pipe (8), a spherical pit is provided in the center of the top of the sealing gasket (9), a liquid outlet (1) is provided in the bottom of the pit, the bottom of the ball (3) matches and is tightly attached to the spherical pit in the top of the sealing gasket (9), the annular magnet (2) is fixed to the bottom face of the liquid outlet pipe (8), and the electromagnetic coil (5) is fixed on an outer face of the liquid outlet pipe (8). With the test kit, manual opening of the test kit to take out a reagent for test operation is not needed, and requirements of an automatic test system are met.

4 Claims, 2 Drawing Sheets

(56) References Cited

U.S. PATENT DOCUMENTS

| | | | | |
|---|---|---|---|---|
| 4,084,425 A | * | 4/1978 | Bae | G01N 9/002 |
| | | | | 73/32 A |
| 5,703,359 A | * | 12/1997 | Wampler, III | B01D 69/108 |
| | | | | 73/864.81 |
| 2014/0069528 A1 | * | 3/2014 | Ware | F16K 7/10 |
| | | | | 137/488 |

FOREIGN PATENT DOCUMENTS

| | | | |
|---|---|---|---|
| CN | 206889801 | * | 1/2018 |
| CN | 209146340 U | | 7/2019 |
| CN | 209646527 U | | 11/2019 |
| CN | 209800828 U | | 12/2019 |
| CN | 111175528 A | | 5/2020 |
| CN | 111308110 A | | 6/2020 |
| CN | 211697841 U | | 10/2020 |
| CN | 211718319 U | | 10/2020 |
| JP | 2004309431 A | | 11/2004 |

* cited by examiner

US 12,392,793 B2

TEST KIT

CROSS REFERENCE TO RELATED APPLICATIONS

This application is a National Stage Application of International Application Number PCT/CN2020/135702, filed Dec. 11, 2020; which claims priority to Chinese Application No. 201911314110.4, filed Dec. 19, 2019.

TECHNICAL FIELD

The present invention relates to a test equipment, and particularly to a novel test kit.

BACKGROUND ART

Test kits are a sort of test equipment commonly used in labs for storing various liquid reagents to be used in tests. When the tester needs to take the reagent out from a test kit, it is a common practice for the tester to open a cover of the test kit, draw a certain amount of reagent with a syringe or a dropper, and then use the obtained reagent for the test operation. Since the process involves manual operation, the hands and body of the tester or the test equipment may be contaminated by the reagent if the tester is unskilled or careless in the operation. The consequences may be very serious if the reagent being used is corrosive or toxic to a certain extent.

Contents of the Invention

Technical Problem

The technical problem to be solved by the present invention is to provide a novel test kit for solving a problem that manual operation is required when the existing test kits are used in the prior art.

Solution to the Problem

Technical Solution: the technical solution utilized by the present invention is: a novel test kit, comprising a box body and a cylindrical liquid discharge tube fixed at the bottom of the box body, wherein a circular sealing gasket is provided on and fixedly connected to the lower part of an inner wall of the liquid discharge tube, the sealing gasket is provided with a circular liquid outlet perpendicularly penetrating through a center of the sealing gasket, a ball that can slide along the inner wall of the liquid discharge tube is provided at the top of the liquid outlet, a magnetic rod that can slide along the inner wall of the liquid discharge tube is fixed to the upper part of the ball, a solenoid coil is provided at the upper part of the outside of the liquid discharge tube and fixedly connected to the upper part of the outside of the liquid discharge tube, and a circular tube-shaped air inlet in communication with the interior of the box body and the exterior of the box body is provided at the top of the box body and fixedly connected to the top of the box body.

Furthermore, the material of the sealing gasket is rubber.

Furthermore, the sealing gasket is provided with a spherical pit at the top center of the sealing gasket, the bottom of the spherical pit communicates with the liquid outlet, and the ball is pressed in the spherical pit by the magnetic rod.

Furthermore, the material of the ball is steel.

Furthermore, an annular magnet is provided at the bottom of the liquid discharge tube and fixedly connected to the bottom of the liquid discharge tube.

Beneficial Effects of the Invention

Beneficial Effects

The beneficial effects attained by the present invention are as follows: the opening action and closing action of the liquid discharge means of the novel test kit can be accomplished by energizing and deenergizing the solenoid coil under the control of an electric control system, so that it is unnecessary to manually open the test kit, take out the reagent and then use the reagent for the test operation. In addition, in the present invention, the reagent can be provided quantitatively by controlling the energized duration of the solenoid coil with the electric control system according to the type of the reagent, the air pressure inside the test kit, and other parameters. Therefore, the novel test kit can also meet the requirements of an automatic test system.

BRIEF DESCRIPTION TO THE DRAWINGS

In the figures: 1—liquid outlet; 2—annular magnet; 3—ball; 4—magnetic rod; 5—solenoid coil; 6—box body; 7—air inlet; 8—liquid discharge tube; 9—sealing gasket.

EMBODIMENTS

Embodiments of the Present Invention

Figure 1:
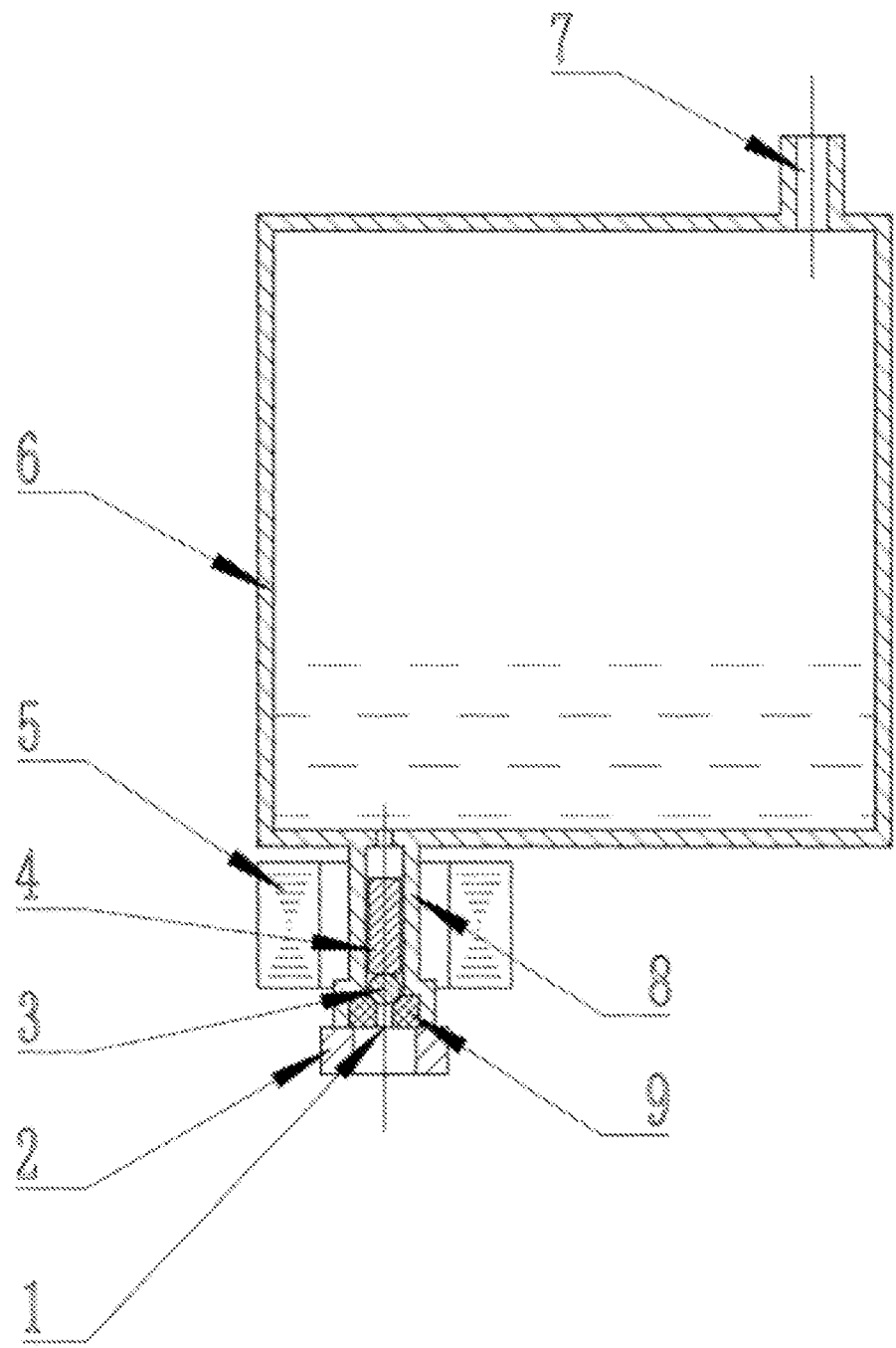
FIG. 1 is a schematic structural diagram of the test kit according to the present invention.
Figure 2:
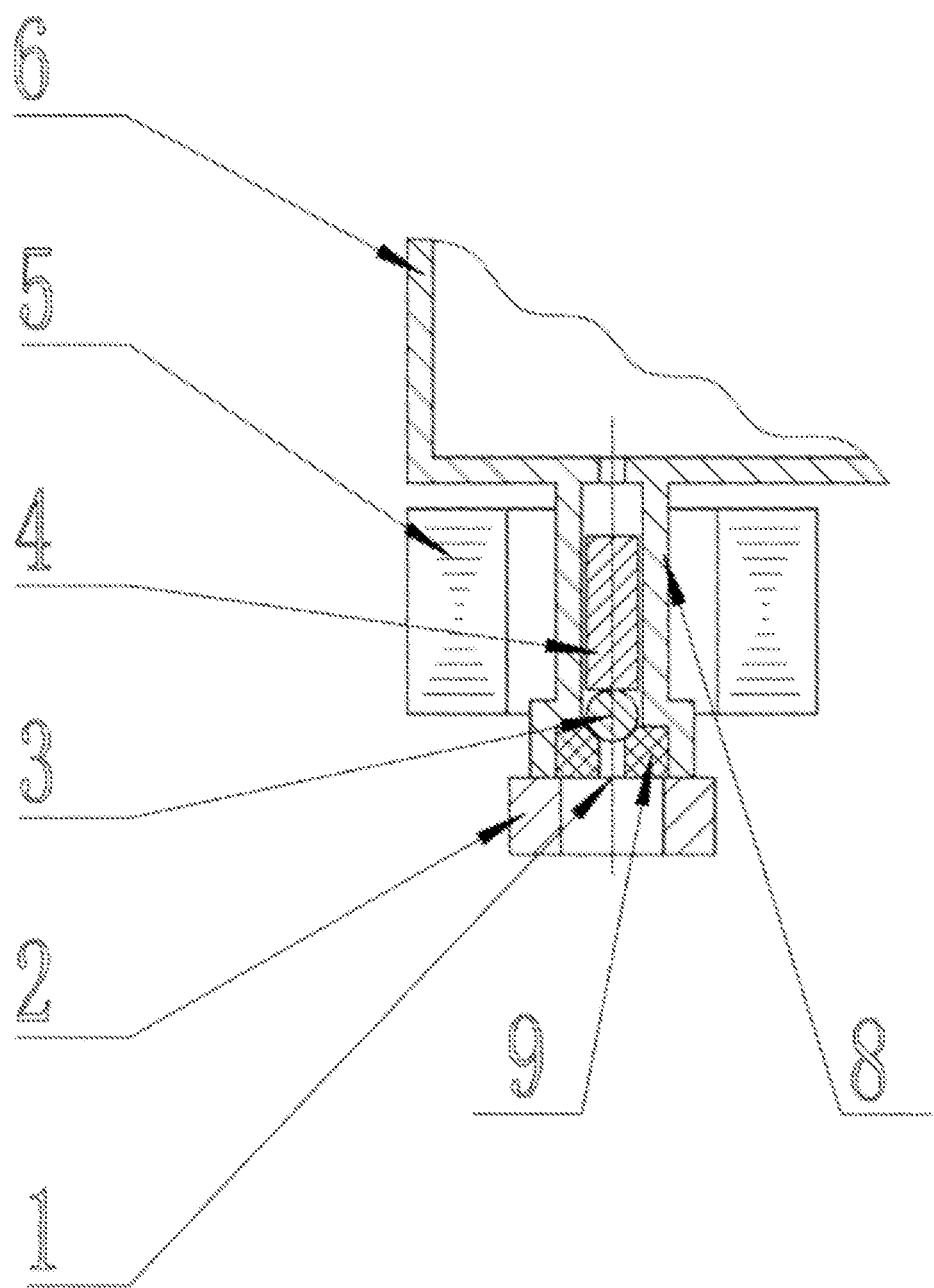
FIG. 2 is a schematic structural diagram of the liquid discharge tube.

As shown in FIGS. 1 and 2, the main structure of the novel test kit comprises a box body 6 which is peripherally enclosed, an air inlet 7 at the top of the box body 6 and a liquid discharge tube 8 at the bottom of the box body 6. All of the box body 6, the liquid discharge tube 8 and the air inlet 7 are made of high-strength plastics or stainless steel, the liquid discharge tube 8 is cylindrical, a circular rubber sealing gasket 9 is provided on the lower part of an inner wall of the liquid discharge tube 8 and fixedly connected to the lower part of the inner wall of the liquid discharge tube 8, the sealing gasket 9 is provided with a circular liquid outlet 1 perpendicularly penetrating the upper surface and lower surface of the sealing gasket 9 at the center of the sealing gasket 9, a ball 3 made of steel is provided at the top of the liquid outlet 1, the diameter of the ball 3 is greater than the diameter of the liquid outlet 1, a magnetic rod 4 is provided at the upper part of the ball 3 and fixedly connected to the upper part of the ball 3, and the ball 3 and the magnetic rod 4 can slide up and down freely inside the liquid discharge tube 8. The sealing gasket 9 is provided with a spherical pit at the top center of the sealing gasket 9, and the bottom of the pit communicates with the liquid outlet 1. A solenoid coil 5 is provided at the upper part of the outside of the liquid discharge tube 8 and fixedly connected to the upper part of the outside of the liquid discharge tube 8. An annular magnet 2 is provided at the bottom of the liquid discharge tube 8 and fixedly connected to the bottom of the liquid discharge tube 8. A test reagent is stored inside the box body 6, the air inlet 7 makes the interior of the box body 6 communicate with an external air source, so that certain air pressure is maintained inside the box body 6. Once the solenoid coil 5 is deenergized, the ball 3 and the magnetic rod 4 fixedly connected to the ball 3 reliably seal the liquid outlet 1 under the action of gravity, the attraction of the annular magnet 2 and the pressure of the liquid inside the box body 6; once the solenoid coil 5 is energized, it generates electromagnetic attraction to the magnetic rod 4 and the ball 3, and the electromagnetic attraction is greater than the sum of the gravity acting on the magnetic rod 4 and the ball 3, the attraction of the annular magnet 2 and the pressure inside the box body 6. As a result, the magnetic rod and the ball 3 slide upward along the inner wall of the liquid discharge tube 8 under the electromagnetic attraction of the solenoid coil 5, thus the ball 3 is separated from the liquid outlet 1, and the reagent inside the box body 6 is discharged through the liquid outlet 1.

The amount of the reagent flowing out of the box body 6 per unit time is related to the air pressure inside the box body 6 and the viscosity of the reagent, since both the gap between the liquid discharge tube 8 and the magnetic rod 4 and the gap between the ball 3 and the liquid discharge tube 8 are fixed values, and both size of the hole at the center of the sealing gasket 9 and size of the hole inside the liquid outlet 8 are also fixed values. Therefore, at a given air pressure inside the box body 6 and a given viscosity of the reagent, the amount of the reagent released from the box body 6 can be controlled by controlling the energized duration of the solenoid coil 5, thus the novel test kit is more suitable for use in an automatic test system.

The invention claimed is:

1. A test kit, comprising:
   a box body (6) having a first side and a second side opposite to the first side, wherein the box body (6) has a circular tube-shaped air inlet (7) at the second side, and the box body (6) is configured for storing reagent inside the box body (6);
   a cylindrical liquid discharge tube (8) having a first end and a second end opposite to the first end, wherein the first end of the cylindrical liquid discharge tube (8) is fixed to the first side of the box body (6) and the cylindrical liquid discharge tube (8) is located outside the box body (6);
   a circular sealing gasket (9) provided in the cylindrical liquid discharge tube (8) at the second end of the cylindrical liquid discharge tube (8) and fixedly connected to the cylindrical liquid discharge tube (8), wherein the circular sealing gasket (9) comprises a circular liquid outlet (1) extending through the circular sealing gasket (9) along a longitudinal direction of the circular sealing gasket (9);
   a solenoid coil (5) surrounding the cylindrical liquid discharge tube (8) and fixedly connected to the cylindrical liquid discharge tube (8);
   an annular magnet (2) provided at and fixedly connected to the second end of the cylindrical liquid discharge tube (8); and
   a ball (3) and a magnetic rod (4) fixed to the ball (3), wherein the ball (3) and the magnetic rod (4) are slidable in the cylindrical liquid discharge tube (8) between the first end of the cylindrical liquid discharge tube (8) and the circular sealing gasket (9), and the magnetic rod (4) is closer to the box body (6) than the ball (3); and
   wherein, when the solenoid coil (5) is deenergized, the ball (3) is in contact with the circular sealing gasket (9) sealing the circular liquid outlet (1) through at least the annular magnet (2).

2. The test kit according to claim 1, wherein a material of the circular sealing gasket (9) is rubber.

3. The test kit according to claim 1, wherein a material of the ball (3) is steel.

4. The test kit of claim 1, the circular sealing gasket (9) comprises a first end and a second end opposite to the first end of the circular sealing gasket (9), and the first end of the circular sealing gasket (9) is provided with a spherical pit such that the ball (3) is fittable into the spherical pit to seal the circular liquid outlet (1) when the ball (3) is in contact with the circular sealing gasket (9).

\* \* \* \* \*

UNITED STATES PATENT AND TRADEMARK OFFICE
CERTIFICATE OF CORRECTION

PATENT NO. : 12,392,793 B2
APPLICATION NO. : 17/626897
DATED : August 19, 2025
INVENTOR(S) : Shushun Hao Page 1 of 1

It is certified that error appears in the above-identified patent and that said Letters Patent is hereby corrected as shown below:

In the Specification

Column 4, Line 30, insert --wherein-- after "The test kit of claim 1,"

Signed and Sealed this
Fourteenth Day of October, 2025

John A. Squires
*Director of the United States Patent and Trademark Office*